US005244730A

United States Patent [19]

Nguyen et al.

[11] Patent Number: 5,244,730

[45] Date of Patent: Sep. 14, 1993

[54] PLASMA DEPOSITION OF FLUOROCARBON

[75] Inventors: Thao N. Nguyen, Katonah; Gottlieb S. Oehrlein, Yorktown Heights; Zeev A. Weinberg, White Plains, all of N.Y.

[73] Assignee: International Business Machines Corporation, Armonk, N.Y.

[21] Appl. No.: 693,736

[22] Filed: Apr. 30, 1991

[51] Int. Cl.[5] .......... B32B 27/00; B05D 3/06

[52] U.S. Cl. .......... 428/336; 427/490; 427/551; 428/421; 428/463

[58] Field of Search .......... 428/421, 336, 64, 463, 428/488, 490, 489, 41; 204/192.15

[56] References Cited

U.S. PATENT DOCUMENTS

| | | | |
|---|---|---|---|
| 3,518,108 | 6/1970 | Heiss, Jr. et al. | 427/488 |
| 4,013,532 | 3/1977 | Cormia et al. | 204/192.15 |
| 4,252,848 | 2/1981 | Datta et al. | 428/64 |
| 4,391,843 | 7/1983 | Kaganowicz et al. | 427/490 |
| 4,407,852 | 10/1983 | Sapieka et al. | 427/489 |
| 4,729,906 | 3/1988 | Kleeberg et al. | 427/490 |

OTHER PUBLICATIONS

Ozawa, "Organic Thin-Film Capacitor".
Williams & Hayes, "Polymerization in a Glow Discharge".
Dittmer, "Plasma Polymerization of Coatings in Vacuum".
Bradley & Hammes, "Electrical Propertiers of Thin Organic Films".
Ristow, "Time-Dependent Properties of Organic Thin Films Deposited By Glow Discharge".
Gazicki & Yasuda, "Electrical Properties of Plasma-Polymerized Thin Organic Films".
Biederman & Nedbal, "Dielectric Properties of Fluorocarbon and Chlorofluorocarbon Films Plasma Polymerized in an R.F. Glow Discharge".
Washo, "Surface Property Characterization of Plasma-Polymerized Tetrafluoroethylene Deposits".
O'Kane & Rice, "Preparation and Characterization of Glow Discharge Fluorocarbon-Type Polymers".
Yasuda & Morosoff, "Plasma Polymerization of Tetrafluoroethylene. I. Inductive Radio Frequency Discharge".
Emeleus, "The Chemistry of Fluorine and its Compounds".
Hetzler & Kay, "Conduction Mechanism in Plasma-Polymerized Tetrafluorethylene Films", J. Appl. Phys. 49(11) Nov. 1978, pp. 5617-5623.
Tibbitt et al., "Dielectric Relaxations in Plasma-Polymerized Hydrocarbons and Fluorocarbons".
Morosoff & Yasuda, "Plasma Polymerization of Tetrafluoroethylene. II. Capacitative Radio Freqeuncy Discharge".
Morosoff & Yasuda, "Plasma Polymerization of Tetrafluoroethylene. III. Capacitative Audio Frequency (10 kHz) and AC Discharge".
Vollmann & Poll, "Electrical Conduction in Thin Polymer Fluorocarbon Films".
Kometani et al., "Chemical Abstracts".

*Primary Examiner*—Thomas J. Herbert, Jr.
*Attorney, Agent, or Firm*—Pollock, Vande Sande & Priddy

[57] ABSTRACT

Polymeric fluorocarbon layer is prepared by plasma enhanced chemical vapor deposition in a chamber, the walls of which are coated with a polymeric fluorocarbon film by introducing a gaseous polymerizable fluorocarbon into the chamber and applying radio-frequency at a power level of about 100 to about 1000 watts, employing a pressure of about 10 to 180 mTorr and a self-bias voltage of about −50 to about −700 volts. The polymeric fluorocarbon layer is about 0.05 to about 5 μm thick, has a maximum dielectric constant of about 2.5, has a C/F ratio of about 1:1 to about 1:3, is thermally stable at temperatures of at least about 350° C., and is substantially free from metallic contamination and oxygen.

12 Claims, 1 Drawing Sheet

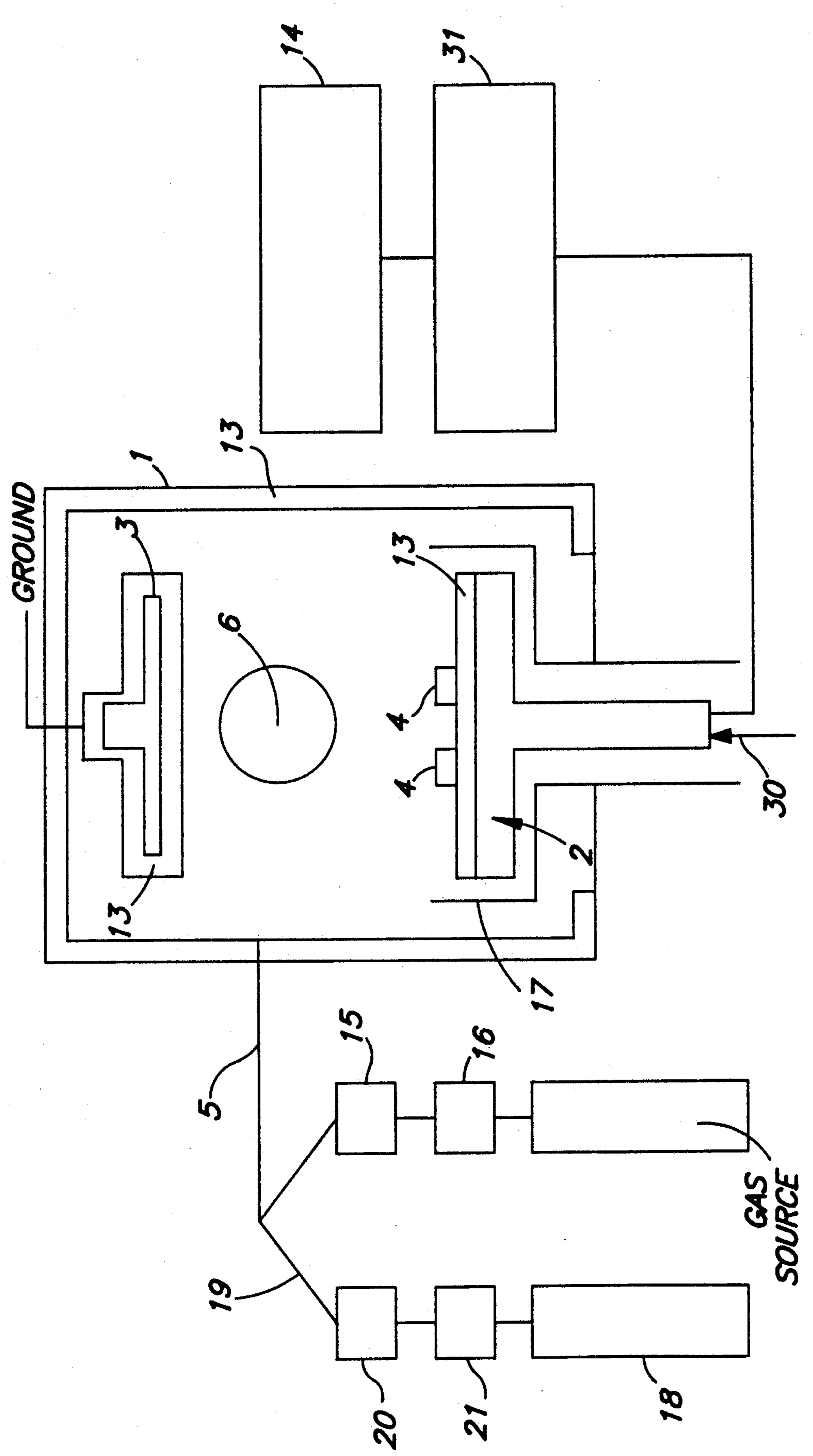
14
31
1
13
GROUND
3
6
13
4
4
2
30
13
17
5
15
16
GAS SOURCE
19
20
21
18

PLASMA DEPOSITION OF FLUOROCARBON

TECHNICAL FIELD

The present invention is concerned with fabricating polymeric fluorocarbon layers, and especially concerned with fabricating such layers by a plasma-enhanced chemical vapor deposition. The fluorocarbon films produced by the process of the present invention are especially useful as insulating materials and specifically as interlevel insulating material between metal line interconnects in integrated circuits. The process of the present invention is compatible with projected integrated chip processing and provides high reliability, batch processing, compatibility with vacuum integrated processing and a good deposition rate for back-end-of-line (BEOL) applications.

BACKGROUND ART

In advanced microelectronic chips, structures referred to as back-end-of-line (BEOL) metallization employ several layers of metal interconnections each separated by a dielectric layer. At the present time, the dielectric typically employed is made of sputtered quartz which has a dielectric constant of about 3.9. However, in order to reduce signal delays in chips for the future, it will be necessary to reduce the dielectric constant so that the capacitance of the metallic layers will be reduced. Much work is presently being done in attempts to replace the quartz with various polyimides. The polyimides typically have a dielectric constant that is at least about 2.8. The polyimides are generally provided onto a chip by wet spin-on techniques followed by subsequent drying at elevated temperatures. However, wet-processing, spin-on and drying processing are not especially desirable since such techniques are difficult to control and tend to employ organic solvents that are undesirable from an environmental viewpoint.

Fluorinated polymeric materials such as poly(tetrafluoroethylene)(PTFE) are attractive candidates for advanced electronic packaging applications because of their relatively low dielectric constants, excellent chemical stability, low solvents/moisture absorption and excellent thermal stability. However, because of their relative chemical inertness and hydrophobic nature, these halogenated polymeric materials are difficult to process into electronic packaging structures. The lack of effective processing techniques has inhibited the exploitation of these materials by the electronics industry.

Although there have been various suggestions to produce films of polymeric fluorocarbon by plasma polymerization, the films formed would not be suitable as an insulating layer in integrated circuits since such prior films lack at least one characteristic necessary for providing a suitable dielectric or insulating layer. For instance, many of the prior suggested films inherently include metallic particles deposited during the plasma processing.

SUMMARY OF INVENTION

The present invention provides a process for plasma deposition of polymeric fluorocarbon films that is compatible with batch chip processing as well as offering the advantage of integrated processing that can take place entirely within a vacuum chamber. The process of the present invention makes it possible to exclude such processing techniques as wet-processing, spin-on coating and drying and, therefore, providing a more reliable product. In addition, the present invention overcomes the problems inherently present in prior art plasma deposition techniques and provides a polymeric fluorocarbon film exhibiting the necessary properties that such can be employed as the insulating layer in integrated circuits.

In particular, the polymeric fluorocarbon layer or film that is obtained pursuant to the present invention can be about 0.01 μm to about 5 μm thick with a dielectric constant of about 2.0. The polymeric fluorocarbon film is thermally stable at temperatures of at least about 350° C., exhibits a C/F ratio of about 1:1 to about 1:3, and is substantially, if not entirely, free from metallic contamination.

The coating technique of the present invention involves placing the substrate onto which the film is to be coated, and a working electrode into a chamber capable of being evacuated. The walls of the chamber and the electrode are coated with a polymeric fluorocarbon film. In addition, the electrode is capacitively coupled. A gaseous polymerizable fluorocarbon is introduced into the chamber and radio-frequency power of about 100 watts to about 1000 watts is applied to the working electrode. During the deposition, the pressure in the chamber is about 10 to about 180 mTorr and the self-bias voltage on the working electrode is about −50 to about −700 volts.

In addition, the present invention is concerned with a coated substrate obtained by the above-described method.

BRIEF DESCRIPTION OF DRAWINGS

The drawing illustrates a schematic diagram of apparatus suitable for carrying out the process of the present invention.

BEST AND VARIOUS MODES FOR CARRYING OUT INVENTION

The polymeric fluorocarbon film of the present invention can be deposited onto a substrate employing a rf diode plasma deposition system of the type schematically illustrated in FIG. 1. The apparatus includes a vacuum chamber 1 that can be constructed from, for example, stainless steel and should be a gas tight reaction chamber. In one particular example, the vacuum chamber has a volume of about 48 liters, is about 11 inches high and about 18 inches wide. Located within the vacuum chamber 1 is a first working electrode 2 and a second electrode 3. The working electrode 2 and the second electrode 3 can be fabricated from aluminum or quartz. The electrodes are held in place with struts (not shown). The working electrode is preferably water-cooled through via 30. The first electrode 2 is capacitively connected to a radio frequency power source 14. Numeral 17 represents a ground shield, typically about 1 mil from the electrode to prevent sputtering of the electrode material during the deposition. The surface area of the working or first electrode 2 is typically less than and preferably about ½ to 1/10, and most preferably about ¼ of the combined surface area of the second electrode and interior walls of the chamber 1. The electrodes typically have diameters of about 6 inches to about 18 inches and more typically about 12 inches to about 16 inches. The second electrode is connected to ground. In a vacuum chamber having the above described dimensions, the electrodes typically are spaced about 2 to about 10 inches apart and more typically about 8 inches apart. The substrate upon which the film is to be deposited is represented by numeral 4 and is located adjacent to and supported by the working electrode 2. The walls of the chamber and surfaces of the electrodes are coated with film of a fluorocarbon polymer 13. This is essential in assuring that the deposited fluorocarbon film is free from metallic contamination as well as assuring that the electrical properties of the discharge during the plasma coating are within the parameters necessary for achieving the desired film characteristics. The thickness of the fluorocarbon film 13 such as polytetrafluoroethylene on the walls of the chamber and the electrodes is critical to the success of the present invention and is typically about 1 to about 5 microns, preferably about 2 to about 5 microns, and most preferably about 2 to about 3 microns. In the event the film is too thin, contamination of the fluorocarbon film being deposited will not be prevented and the necessary electrical properties of the chamber during the deposition will not be maintained within the parameters required. On the other hand, if the layer is too thick, such will tend to lose its adhesion to the walls of the chamber thereby, causing particle contamination and pin holes in the polymeric fluorocarbon film being deposited.

Preferably, the fluorocarbon film 13 is the said as the polymeric fluorocarbon to be subsequently deposited.

The fluorocarbon film 13 can be provided on the walls of the chamber and electrodes by introducing into the chamber via conduit 5, a gaseous polymerizable fluorocarbon.

The chamber prior to introduction of the gas can be evacuated through vacuum coupling 6. The flow of the gas can controlled by valve 15 and measured by linear mass flow meter 16. The gaseous polymerizable fluorocarbon introduced into the chamber includes $C_2F_4$, $C_4F_8$, $C_3F_8$, and $C_2F_6$ and preferably is $C_2F_4$. The gaseous fluorocarbon is typically fed into the chamber at a rate of about 20 to about 150 standard cubic centimeters per minute (sccm) and preferably at about 100 sccm which corresponds to a residence time of about 0.9 seconds of the gaseous polymerizable fluorocarbon in a plasma chamber having a volume of about 48 liters. Prior to introduction of the gaseous fluorocarbon into the chamber, the chamber is evacuated, for instance, using a turbo molecular pump to provide a vacuum of at least about $10^{-6}$ torr.

The initial phase in coating the walls and electrodes is carried out in a manner so as to minimize ion bombardment of the first electrode 2 in order to assure against excessive incorporation of impurities into the fluorocarbon film 13. This can be accomplished by employing rf power supplied to the working electrode 2 of about 50 to about 100 watts.

The power density is typically about 0.02 to about 0.05 W per $cm^2$ of the working electrode surface are. The pressure during this phase is typically about 100 mTorr to about 200 mTorr and more typically about 200 mTorr. The radio frequency is typically about 1 to about 100 megahertz and more typically 13.56-MHz. The rf power is capacitatively fed to the working electrode using a matching network 31 which includes a DC-blocking capacitor to minimize reflected power. The combination of pressure and power is selected to minimize the self-bias voltage on working electrode 2 to −50 volts or less.

This initial phase of coating the walls and electrode is normally carried out for about 5 to about 10 minutes. After this, the gas pressure is preferably reduced and the rf power is preferably increased, and the self-bias on the electrode 2 is typically increased. In particular, at this phase of coating the walls and electrodes, the amount of rf power that is supplied to the electrode 2 is in the range of about 100 watts to about 1000 watts, preferably about 200 to about 800 watts and most preferably about 200 watts to about 400 watts. The power density is typically about 0.05 to 0.4 W per $cm^2$ of the working electrode surface area and more typically about 0.15 W per $cm^2$ of the working electrode surface area. The pressure during the deposition is maintained in the range of about 10 to about 180 mTorr and preferably at about 20 to about 100 mTorr and most preferably about 26 mTorr. The radio frequency is typically about 1 to about 100 megahertz and more typically 13.56-MHz. The rf power is capacitatively fed to the working electrode using a matching network 31 which includes a DC-blocking capacitor to minimize reflected power. The self-bias voltage on the working electrode 2 should be about −50 volts to about −700 volts and typically about −500 volts to about −700 volts. This phase of the coating of the walls and electrodes is usually carried out for about 30 minutes to about 2 hours.

After the walls of the chamber and the electrodes are precoated with fluorocarbon film 13, the substrates 4 upon which the fluorocarbon films are to be deposited are placed on working electrode 2 in the chamber.

The desired gaseous polymerizable fluorocarbon can be introduced into the chamber via the conduit 5. The chamber prior to introduction of the gas can be evacuated through vacuum coupling 6. The flow of the gas can controlled by valve 15 and measured by linear mass flow meter 16.

The gaseous polymerizable fluorocarbon introduced into the chamber includes $C_2F_4$, $C_4F_8$, $C_2F_6$, and $C_2F_6$ and preferably is $C_2F_4$. The gaseous fluorocarbon is typically fed into the chamber at a rate of about 20 to about 150 standard cubic centimeters per minute (sccm) and preferably at about 100 sccm which corresponds to a residence time of about 0.9 seconds of the gaseous polymerizable fluorocarbon in a plasma chamber having a volume of about 48 liters. Prior to introduction of the gaseous fluorocarbon into the chamber, the chamber is evacuated, for instance, using a turbo molecular pump to provide a vacuum of at least about $10^{-6}$ torr.

The amount of rf power that is supplied to the working electrode 2 is in the range of about 100 watts to about 1000 watts, preferably about 200 to about 800 watts and most preferably about 200 watts to about 400 watts. The power density is typically about 0.05 to 0.4 W per $cm^2$ of the working electrode surface area and more typically about 0.15 W per $cm^2$ of the working electrode surface area. The pressure during the deposition is maintained in the range of about 10 to about 180 mTorr and preferably at about 20 to about 100 mTorr and most preferably about 26 mTorr. The radio frequency is typically about 1 to about 100 megahertz and more typically 13.56-MHz. The rf power is capacitatively fed to the working electrode using a matching network 31 which includes a DC-blocking capacitor in series with the working electrode 2 to minimize reflected power. It is critical to the success of the present invention that the self-bias voltage on the working electrode 2 be about −50 volts to about −700 volts and preferably about −500 volts to about −700 volts. The precoating of the walls of the chamber and the electrodes is instrumental in achieving the necessary self-bias on the working electrode. The process of the present invention by the judicious selection of the various process parameters results in achieving the unique properties of the fluorocarbon film by achieving energetic bombardment with ionized fluorocarbon fragments during the deposition. The energetic ion bombardment causes ion-enhanced etching of the film and gasifies the more volatile components of the growing film. Ion bombardment serves, therefore, to in situ remove, during growth, species which are inherently produced in the plasma and which would otherwise be incorporated in the growing film but which would adversely affect the properties of the deposited material. For instance, such would significantly reduce the thermal stability of the deposited film. The energy of the ions and the ion flux and accordingly the final properties of the fluorocarbon film depend on the pressure, power and self-bias voltage during the deposition. Films, pursuant to the present invention, whereby high ion bombardment during deposition occur exhibit much better thermal stability than films deposited without or with very little ion bombardment.

Because of the difference between ion and electron mobilities in the plasma and since the working electrode is effectively electrically isolated and connected to the power generator across a blocking capacitor, a DC bias potential appears on the electrode. As a result of the DC bias potential, the working electrode and substrate are subjected to positive ions from the plasma. The positive ion bombardment tends to give rise to deposited films of relatively high density. Such high density films tend t resist taking up of oxygen from the air.

The films deposited, pursuant to the present invention, are normally deposited at a rate of about 30 nanometers/minute to about 50 nanometers/minute. The temperature of the substrate during the deposition is normally at about room temperature, but the energetic ion bombardment will cause some heating of the substrate during deposition. Accordingly, the substrate temperature during deposition will be from about room temperature to about 100° C.

Films deposited, pursuant to the present invention, typically are about 0.01 to about 5 microns, more typically about 0.02 to about 5 microns and preferably about 0.1 to about 1 microns.

The films deposited, pursuant to the present invention, exhibit predominantly C—$CF_x$ bonding (greater than 33% of the film) and have a fluorine/carbon ratio of about 1:1 to about 3:1 and preferably about 1:1 to about 1.8:1. The films are thermally stable (substantially no loss in film thickness) when heated to at least 350° C. for at least 30 minutes in dry nitrogen. In addition, the dielectric constant of the film is a maximum of about 2.5, preferably about 1.9 to about 2.3 and most preferably about 1.9 to about 2.2. The films of the present invention are highly crosslinked as contrasted to the linear films obtained by bulk polymerization.

Also, the preferred films of the present invention are of relatively high density and stable in air resisting the take up of oxygen from the air. On the other hand, fluorocarbon materials prepared by prior art plasma procedures tend to be lower in density, which in turn, renders such susceptible to oxygen take up from the air. This, in turn, tends to increase the dielectric constant of the material to undesirably high levels and results in loss of adhesion.

The polymeric fluorocarbon films, pursuant to the present invention, are substantially, if not entirely, free from metallic contamination such as aluminum, iron, nickel or chromium present in prior art films and have less than about 0.5% oxygen impurities. In addition, less than about 1% hydrogen is present in the films.

Periodically, such as after the chamber has been used for about 10 hours, the films deposited on the walls and electrodes because of increase in thickness is removed from the chamber by running an oxygen discharge at about 100 mTorr pressure, about 100 sccm flow of oxygen and a power of about 200 watts for about 1 hour to completely remove the film from the walls and electrodes. The oxygen or other gas can be introduced from gas source tank 18 via conduits 19 and 5 into the chamber 1. The flow rate can be controlled by valve 20 and monitored using linear mass flow meter 21. The oxygen cleaning is then followed by a discharge of $CF_4$ and at about 25 mTorr, at about 100 sccm total flow and about 200 watts of power for about 10 minutes in order to replace at least most of the oxygen absorbed on the walls of the system with fluorine. Subsequently, the walls are again coated as described above with a fluorocarbon film such as polytetrafluoroethylene to the desired thickness.

Methods to obtain enhanced adhesion between the polymeric fluorocarbon layer and various underlying substrates are disclosed in copending U.S. patent application Ser. No. 07/693,735 and Ser. No. 07/693,734, disclosure of which are incorporated herein by reference.

The following non-limiting examples are presented to further illustrate the present invention.

EXAMPLE 1

The chamber walls and electrodes of apparatus of the type described above are precoated by introducing $C_2F_4$ into the previously evacuated chamber at a flow rate of about 100 sccm which corresponds to a residence time of about 0.9 seconds of the $C_2F_4$ in the plasma chamber having a volume of about 48 liters. The pressure during the first 10 minutes of the precoating is about 200 mTorr and the amount of 13.56-MHz rf power supplied to the working electrode is about 100 watts. The self-bias voltage at the working electrode is about −50 volts. The precoating is continued for an additional 60 minutes employing the same conditions as stated above except that the pressure is about 26 mTorr and the rf power supplied to the working electrode is about 400 watts with the self-bias voltage at the working electrode being about −610 volts. The deposition rate for the precoating is about 30 nanometers/minute.

Next, aluminum substrates are placed on the working electrode and the chamber is evacuated to about $10^{-6}$ torr, after which $C_2F_4$ gas is introduced into the chamber at a flow rate of about 100 sccm. The pressure during the deposition is about 26 mTorr and the amount of 13.56-MHz rf power supplied to the substrate electrode is about 400 watts. The self-bias voltage at the working electrode is about −610 volts.

The deposition rate for the film is about 30 nanometers/minute. The deposition is continued until a film of about 1 μm thickness is deposited on the aluminum substrate.

The film has a fluorine/carbon ratio of about 1.4 and a dielectric constant at 100 kHz of 2.1. Such is thermally stable exhibiting no loss in film thickness when heated to 350° C. for 30 minutes in dry nitrogen. The thickness loss heating at 350° C. for 3 hours in dry nitrogen is less than 5% and only about 10% when heating at 375° C. for 3 hours in a nitrogen atmosphere. The fluorocarbon films as determined by x-ray photoemission spectroscopy have a fluorine/carbon ratio of 1.7 and a predominant amount of C-$CF_x$ bonding. On the other hand, films deposited at relatively higher pressure and a low self-bias voltage of only −20 volts consists primarily of $CF_2$ groups and exhibits inferior thermal stability, beginning to decompose when heated in dry nitrogen to a temperature of about 300° C.

In addition, the film is free from metallic contamination. Current-voltage measurements demonstrate that no leakage occurs in deposited films of one micron thickness up to at least 50 volts.

What is claimed is:

1. A coated substrate obtained by the method of placing the substrate, and a working electrode in a chamber which can be evacuated wherein the walls of said chamber and the electrode are coated with a polymeric fluorocarbon film and wherein the electrode is capacitively coupled;

introducing into said chamber a gaseous polymerizable fluorocarbon;

applying radio-frequency power of about 100 watts to about 1000 watts to said electrode; to thereby deposit a polymeric fluorocarbon film onto said substrate while maintaining the pressure of about 10 to about 180 mTorr and a self-bias voltage on said electrode of about −50 to about −700 volts.

2. The coated substrate of claim 1 wherein the F/C ratio is about 1.8:1 to about 1:1.

3. The coat ed substrate of claim 1 wherein the F/C ratio is about 1.4:1.

4. The coated substrate of claim 1 wherein the oxygen content of the polymeric fluorocarbon is less than about 0.5%.

5. The coated substrate of claim 1 wherein the coating is about 0.1 to about 1 micron thick.

6. A substrate having a thin polymeric fluorocarbon coating thereon of about 0.01 to about 5 microns, wherein said coating has a maximum dielectric constant of about 2.5, is thermally stable at temperatures of at least about 350° C., has a F/C ratio of about 1:1 to about 3:1, has less than about 0.5% oxygen content and is free from metallic contamination and demonstrates effectively no leakage as determined by current-voltage measurements of coatings of one micron thickness up to at least 50 volts.

7. The coated substrate of claim 6 wherein the dielectric constant is about 1.9 to about 2.3.

8. The coated substrate of claim 6 wherein the dielectric constant is about 2 to about 2.2.

9. The coated substrate of claim 6 wherein the hydrogen content of the polymeric fluorocarbon is less than about 1% and wherein said coating is highly crosslinked and exhibits predominantly C-$CF_x$ bonding.

10. The coated substrate of claim 6 wherein the F/C ratio is about 1.8:1 to about 1:1.

11. The coated substrate of claim 6 wherein the F/C ratio is about 1.4:1.

12. The coated substrate of claim 6 wherein the coating is about 0.1 to about 1 micron thick.

* * * * *